Nov. 25, 1952        R. P. DRAKE        2,619,295

BOBBIN WINDING MACHINE

Filed Oct. 26, 1946                     10 Sheets-Sheet 1

INVENTOR.
Russell P. Drake
BY
ATTORNEYS

Nov. 25, 1952  R. P. DRAKE  2,619,295
BOBBIN WINDING MACHINE
Filed Oct. 26, 1946  10 Sheets-Sheet 2

INVENTOR.
Russell P. Drake
BY
ATTORNEYS

INVENTOR.
Russell P. Drake
ATTORNEYS

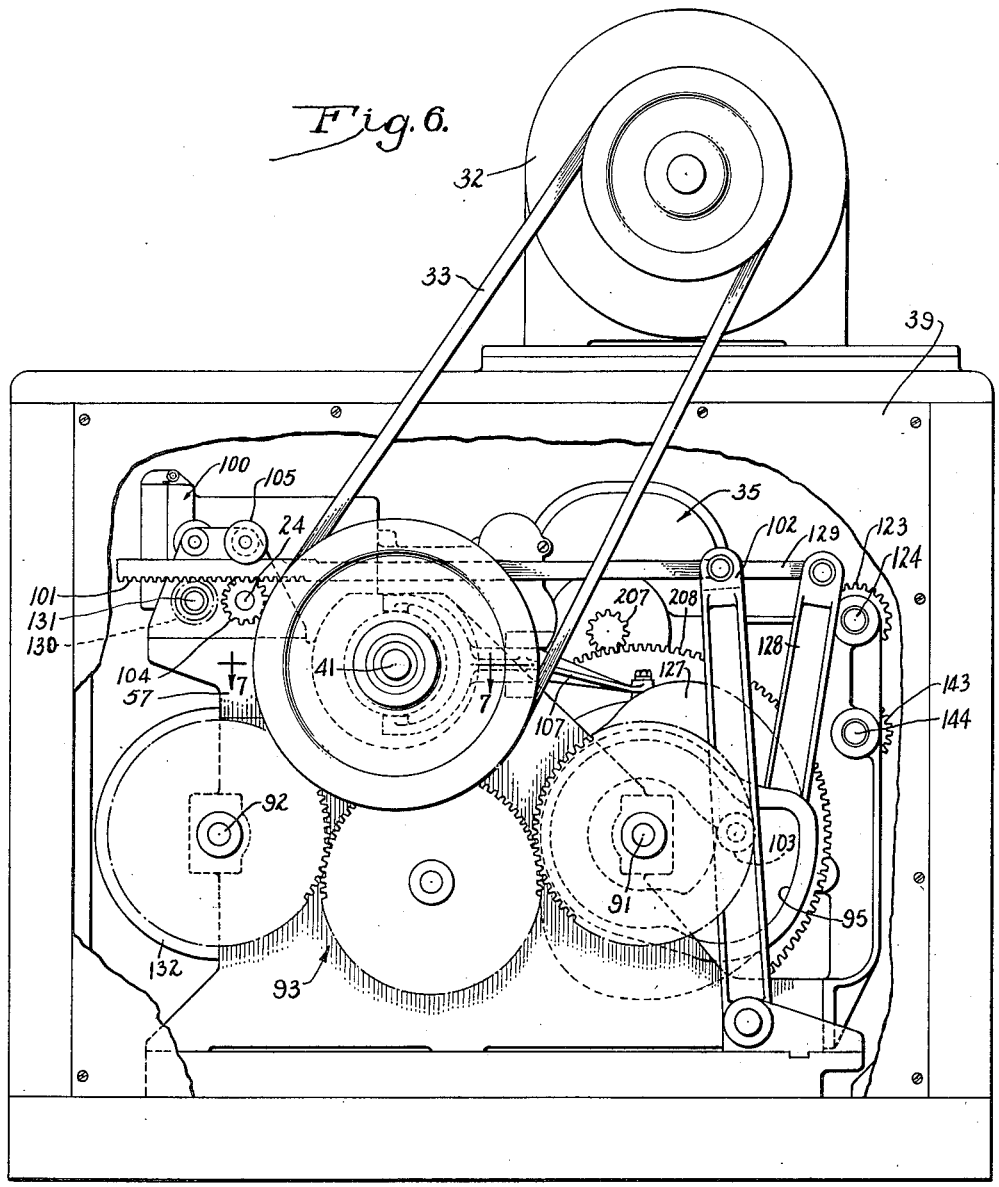

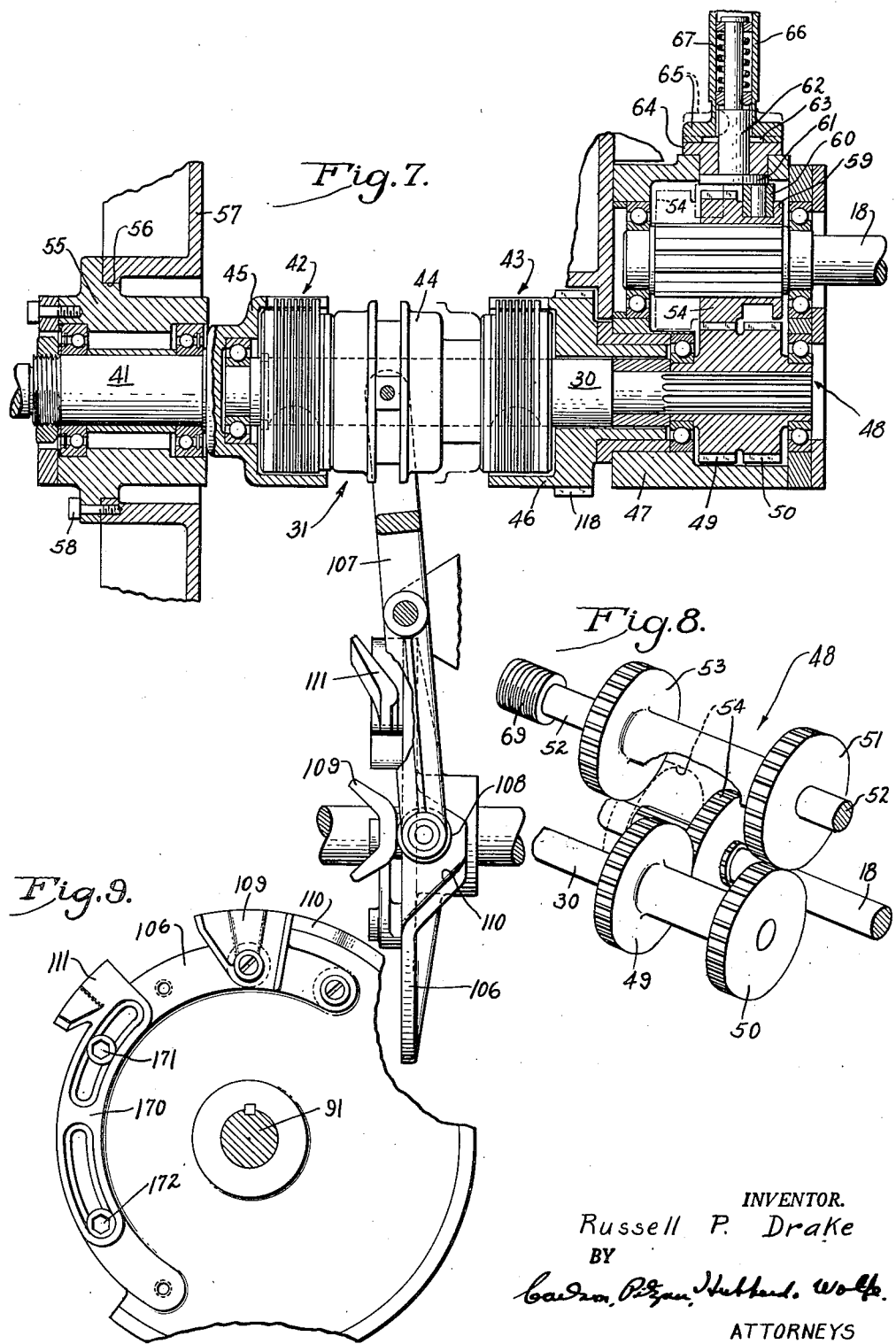

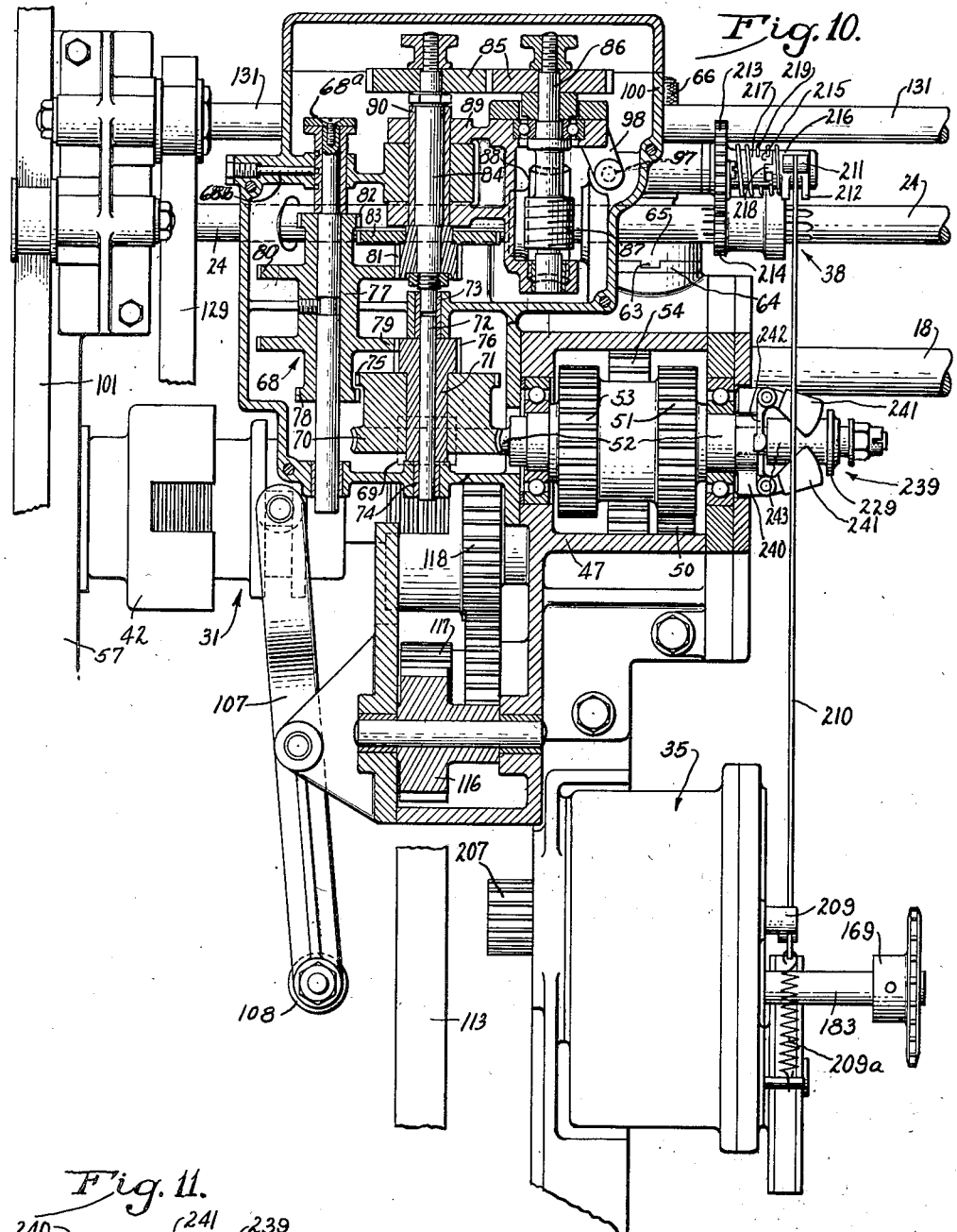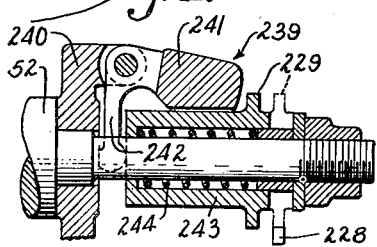

Nov. 25, 1952 — R. P. DRAKE — 2,619,295
BOBBIN WINDING MACHINE
Filed Oct. 26, 1946 — 10 Sheets-Sheet 7

INVENTOR.
Russell P. Drake
BY
ATTORNEYS

Nov. 25, 1952 — R. P. DRAKE — 2,619,295
BOBBIN WINDING MACHINE
Filed Oct. 26, 1946 — 10 Sheets-Sheet 8
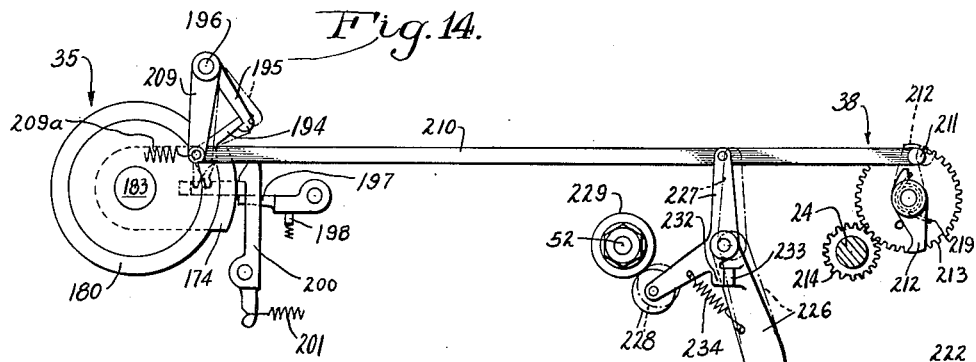
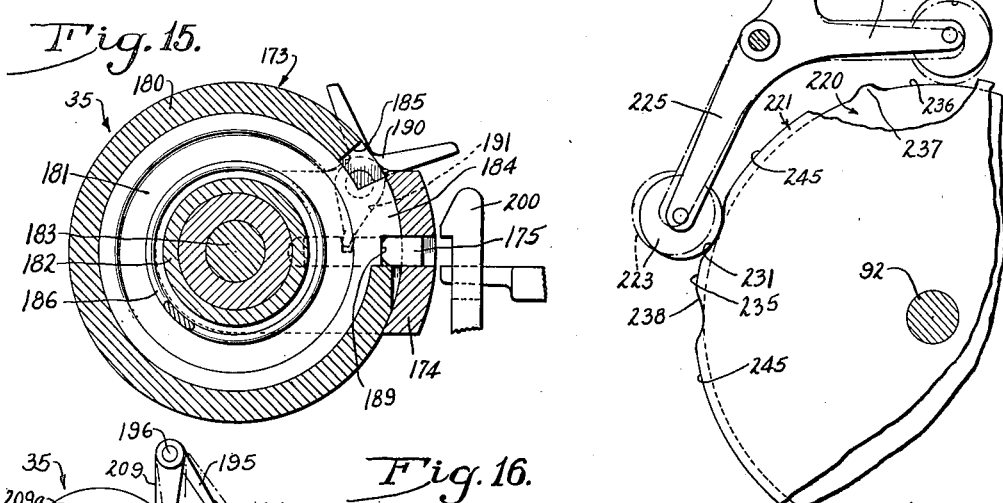
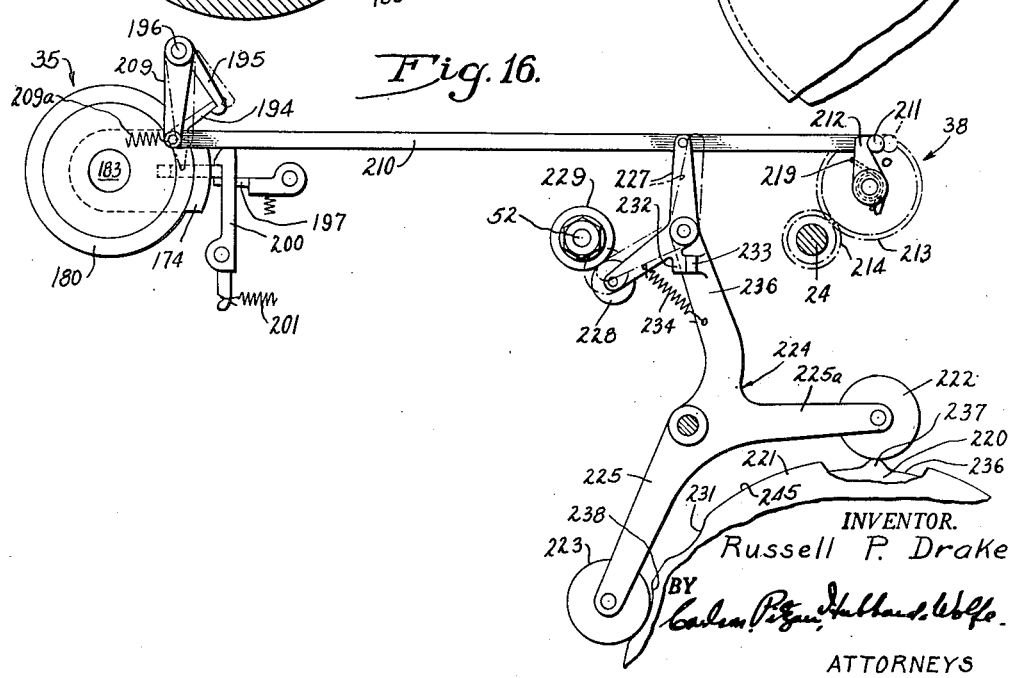
INVENTOR.
Russell P. Drake
ATTORNEYS

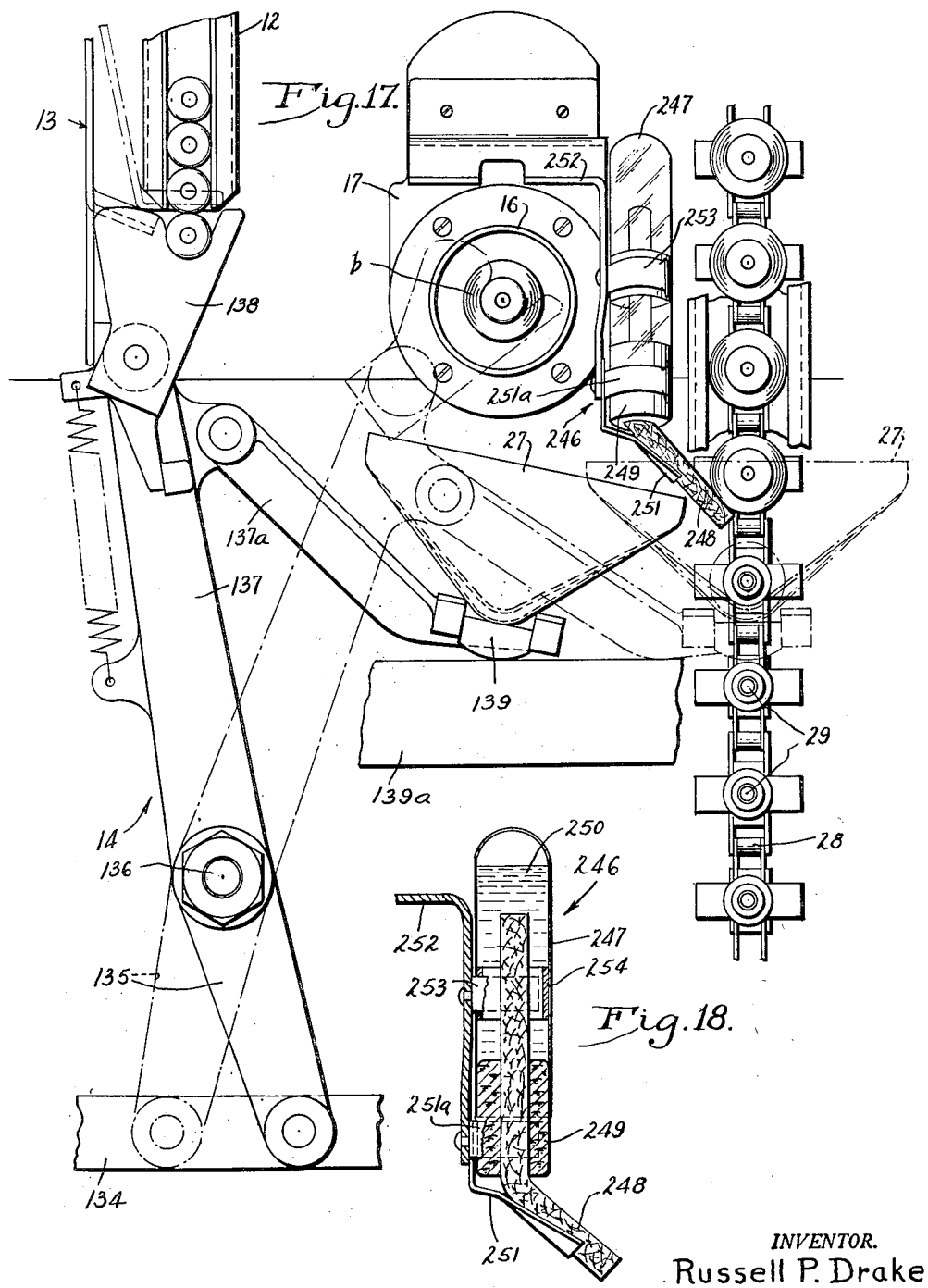

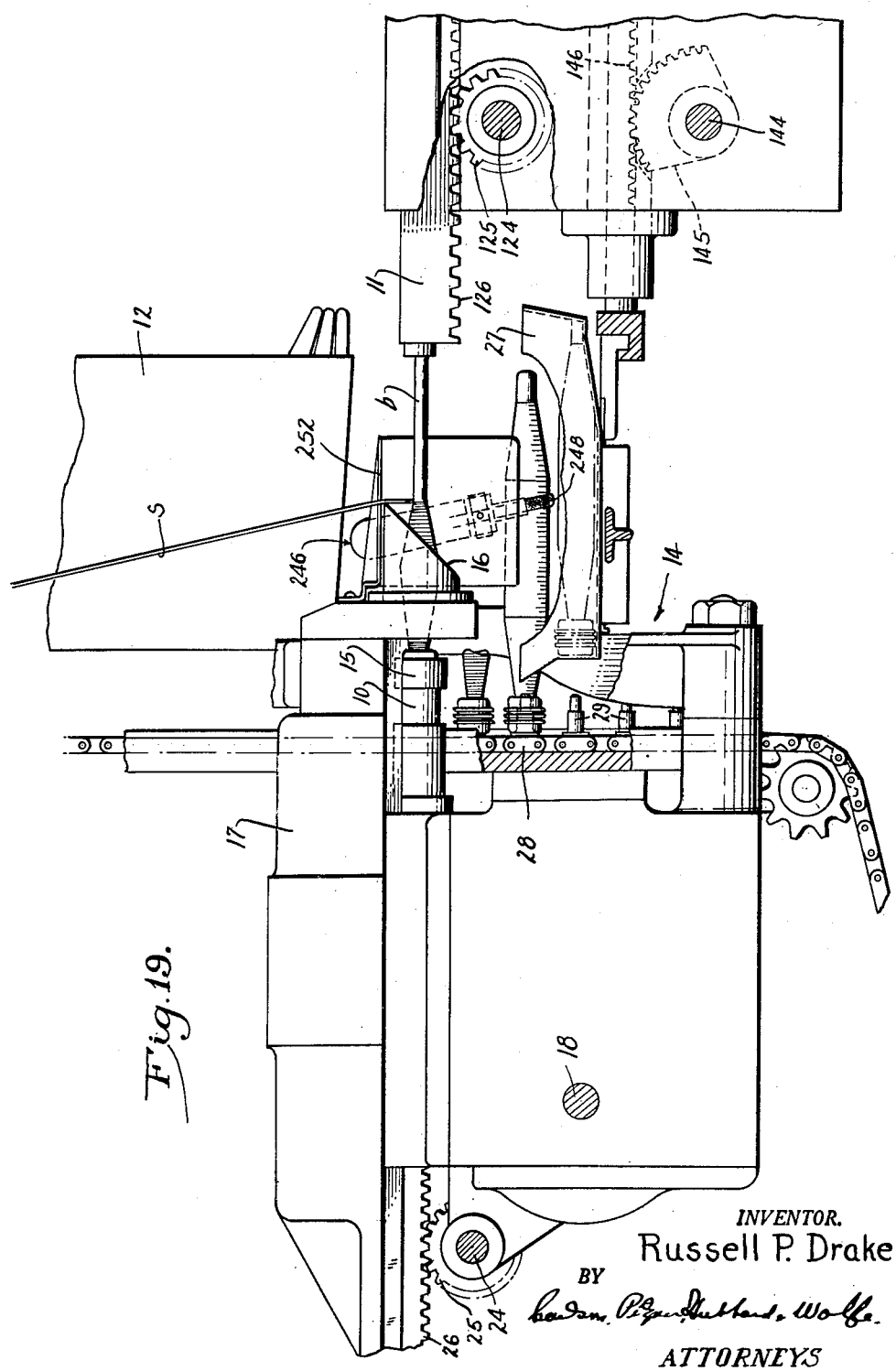

Patented Nov. 25, 1952

2,619,295

UNITED STATES PATENT OFFICE 2,619,295

BOBBIN WINDING MACHINE

Russell P. Drake, Caledonia, Ill., assignor to Barber-Colman Company, Rockford, Ill., a corporation of Illinois Application October 26, 1946, Serial No. 705,834

33 Claims. (Cl. 242—32)

1

The invention relates to machines for winding filling wound bobbins sometimes known as cops or pirns, and has especial reference to a bobbin winding machine of the type disclosed in the copending applications of Brooks Marcellus, Serial Nos. 450,129 and 527,702, filed July 8, 1942, and March 23, 1944, now Patents Nos. 2,409,639 and 2,439,519, respectively.

The primary object of the present invention is to provide an improved driving and control mechanism whereby a more positive control of the winding operation is assured.

Another object is to provide a driving and control mechanism including power driven means for actuating the winding spindles and the yarn traversing mechanisms operatively associated therewith, and an independently driven controller for governing the foregoing operations as well as to perform additional controlling functions to the end that proper operation of the various mechanisms and devices will be accomplished in the proper sequence.

A further object is to provide in a driving and control mechanism of the character indicated, means insuring interruption of rotation of the winding spindles before doffing the wound bobbins.

It is desirable that bobbin winding machines be so constructed that the winding spindles may be driven in either direction depending on the twist of the yarn to be wound, and the invention has for another object the provision of simple and convenient means for changing the direction of rotation of the winding spindles.

Another object is to provide a driving and control mechanism whereby the rate of feed of the yarn traversing devices may be varied according to the material being wound so as to adapt the machine for the winding of such varied materials as cotton, wool, silk and rayon.

A further object is to provide a driving and control mechanism of a rugged character conveniently accessible for purposes of repair, adjustment, etc.

The objects of the invention thus generally set forth, together with other and ancillary advantages, are attained by the construction and arrangement shown by way of illustration in the accompanying drawings, in which:

Figure 1 is a fragmentary front elevational view of a winding machine embodying the invention and showing the left-hand end of such a machine including the first of a series of winding units and also the driving and control mechanism for the machine, the latter being herein shown at the left-hand end of the machine and

2 enclosed within a housing which is shown broken away to expose the mechanism.

Fig. 6 is an end view of the machine looking from the left in Fig. 1 but showing the housing for the driving and control mechanism broken away.

Fig. 7 is an enlarged horizontal section taken approximately in the plane of line 7—7 of Fig. 6.

Fig. 8 is a schematic development of the gearing shown in Fig. 7.

Fig. 9 is a fragmentary detail view showing the face of a clutch shifting cam shown in edge elevation in Fig. 7.

Fig. 10 is an enlarged horizontal sectional view taken approximately in the plane of line 10—10 of Fig. 1.

Fig. 11 is a fragmentary detail sectional view illustrating a speed responsive device forming a part of the control mechanism.

Fig. 14 is a partially schematic view illustrating the means for controlling the aforesaid clutch.

Fig. 15 is a sectional view taken in the plane of line 15—15 of Fig. 13.

Fig. 16 is a view similar to Fig. 14 but with the parts in a different position.

Fig. 17 is a fragmentary front elevational view showing one of the winding units with a device applied to the traversing slide for marking wound bobbins.

Fig. 18 is a vertical sectional view through the marking device itself.

Fig. 19 is a view looking from the left in Fig. 17 with parts broken away to show the bobbin storage chain.

The present invention constitutes an improvement upon bobbin winding machines comprising, in general, a drive mechanism for actuating the winding spindles as well as the yarn traversing means therefor, and a control mechanism operative to initiate and terminate the winding cycle and following termination thereof to condition the machine for the succeeding cycle. The improvement forming the subject of the present invention resides largely in the provision of a control mechanism driven from a motor or other power source, under the control of a quick starting and stopping clutch whose operation is initiated positively by power derived from the drive mechanism upon the completion of one winding cycle and stopped after initiating the succeeding cycle.

Figure 1:
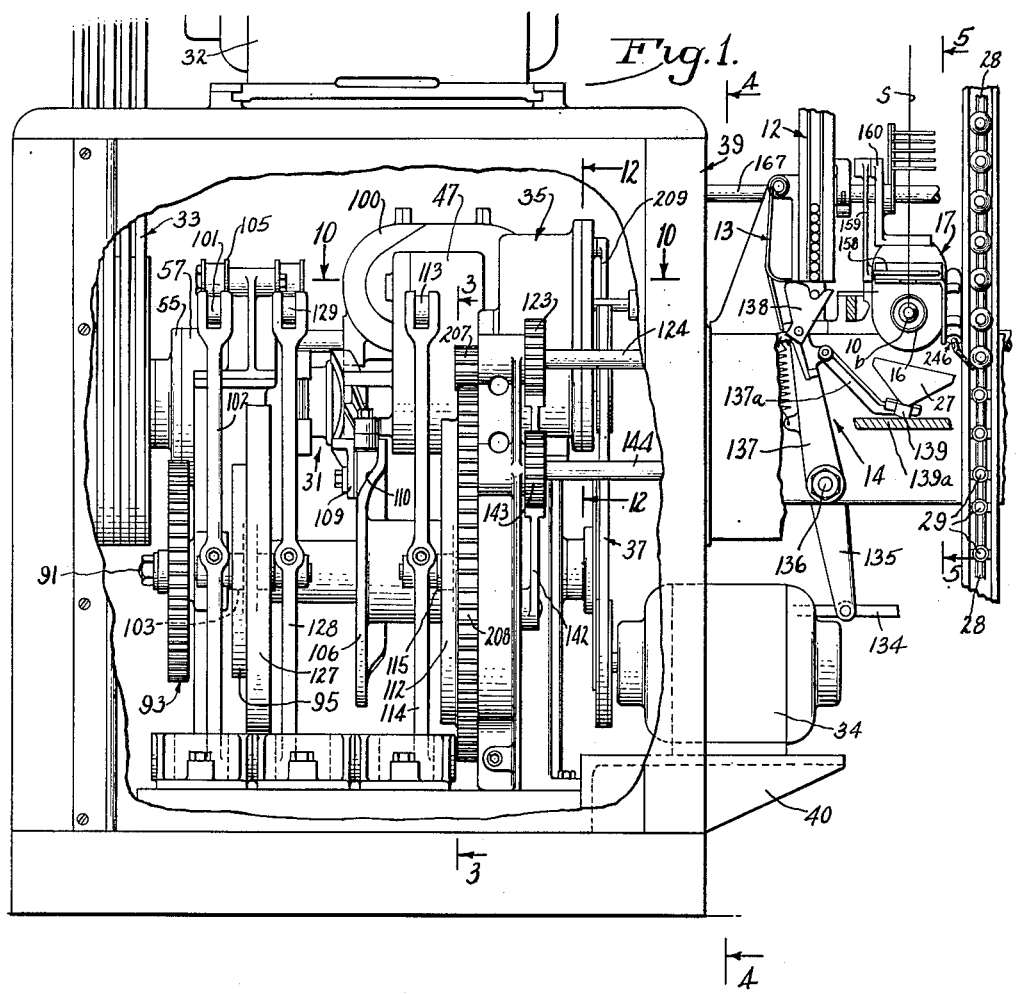
Figure 5:
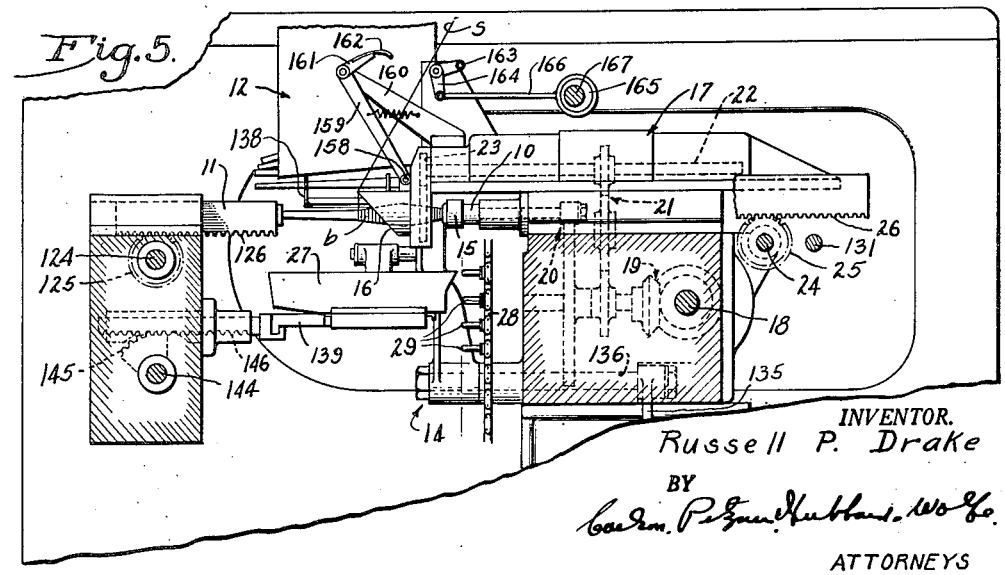
Fig. 5 is a fragmentary vertical sectional view taken approximately in the plane of line 5—5 of Fig. 1 and showing one of the winding units.

Referring now to Figs. 1 and 5 of the drawings, the improved driving and control mechanism is arranged at the left-hand end of a winding machine of the general character set forth in said copending applications. In brief, the machine comprises a series of winding units (one only being herein shown), each including a spindle 10 between which and a centering slide 11 is supported the bobbin b which is to be wound. Empty bobbins contained within a magazine 12 are delivered under the control of a device 13 to a transfer means generally designated 14 by which they are delivered one at a time into position for engagement between the centering slide 11 and a chuck 15 on the spindle.

The yarn or other strand s to be wound extends from a suitably supported yarn mass (not shown) to the bobbin and is engaged by a traversing cam 16 of the type disclosed in Peterson Patent No. 2,326,307, issued August 10, 1943, and comprising a hollow cylindrical member or cam sleeve encircling the winding spindle and rotated unidirectionally, the sleeve having a helical cam surface at its forward end for imparting a traversing movement to the running strand. The cam sleeve is advanced progressively axially of the bobbin to produce a filling wound bobbin. The traversing cam is mounted upon a slide 17 suitably supported upon the machine frame for movement horizontally during the winding operation and thence to a retracted position rearwardly of the chuck 15 preliminary to the succeeding winding operation.

The spindle 10 of each winding unit is driven from a spindle drive shaft 18 extending lengthwise of the machine. As shown in Fig. 5, the driving connection to the spindle comprises bevel gearing 19 and spur gearing 20. The traversing cam 16 is rotated from the shaft 18 through the bevel gearing 19, a spur gear train 21, shaft 22, and spur gearing 23.

During the rotation of the spindle and traversing cam, the latter is advanced axially of the bobbin by a feed mechanism including a shaft 24 extending lengthwise of the machine, each of the winding units having a spur gear 25 meshing with a rack 26 rigid with the slide 17. One of the terminal gears of the spur gear train 21 is splined on its shaft 22 so that the shaft may move with the slide and relative to the gear train 21.

Upon the completion of the winding operation, the wound bobbin is released from the winding spindle and drops into a trough or pocket 27 forming part of the transfer device 14 by which it is carried to a storage chain 28 equipped with a series of bobbin holders in the form of pins 29, the arrangement being such that as an incident to the delivery of an empty bobbin into winding position a wound bobbin is shifted into alinement with one of the pins on the storage chain and subsequently shifted onto the chain in the manner set forth in my copending application Serial No. 553,507, filed September 11, 1944, now Patent No. 2,445,998, issued July 27, 1948.

Referring now to the improved driving and control mechanism, the shaft 18 for driving the winding spindle and the traversing cam (hereinafter termed for convenience "the spindle drive shaft"), and shaft 24 for advancing the traversing slide 17 (hereinafter referred to as "the feed shaft"), are driven from a power drive shaft 30 (Fig. 7) forming the output shaft of a combined clutch and brake unit generally designated 31 to which power is supplied from an electric motor 32 through a belt and pulley drive 33 (Figs. 1 and 6). Operation of the unit is governed by a rotary controller driven in the present instance by a motor 34 under the control of a quick engageable and disengageable clutch generally designated 35 whose input shaft 36 is connected with the motor by a belt and pulley drive 37. The clutch 35 is adapted to be tripped at the end of the winding operation by means generally designated 38 (Fig. 4) actuated mechanically by power derived from the feed shaft 24.

The driving and control mechanism is enclosed within a housing 39 (Fig. 1) at the left-hand end of the machine, the main drive motor 32 being mounted upon the top of the housing, and the controller drive motor 34 on a bracket 40 rigid with the housing. Drive from the motor 32 through the belt and pulley connection 33 is to a stub shaft 41 (Fig. 7) constituting the input shaft of the clutch and brake unit 31. The clutch and brake unit 31 is of a conventional type and includes a disk clutch 42, a brake 43, also of the disk type, and a shifting collar 44, the arrangement being such that when the collar is shifted to the left (Fig. 7) the clutch is engaged so that the output or power drive shaft 30 is driven from the shaft 41 and when the collar is shifted in the opposite direction the clutch is disengaged and the brake is applied. The clutch comprises a housing 45 rigid with the shaft 41 and providing a bearing support for the shaft 30; and the brake includes a housing 46. In the conventional construction the clutch and brake are locked by appropriate means (not shown) in their engaged positions. Also the brake housing is usually stationary, but in the present instance it is supported for rotation in a frame member 47 for a purpose which will hereinafter appear.

The spindle drive shaft 18 and the feed shaft 24 are both driven from the power drive shaft 30 through a gear mechanism 48 shown schematically in Fig. 8 and so constructed and arranged as to actuate the spindle drive shaft in either direction but to actuate the feed shaft unidirectionally irrespective of the direction of rotation of the spindle drive shaft. This gear mechanism includes a pair of axially spaced gears 49 and 50 journaled in a frame member 47 and having a splined connection with the shaft 30. The gear 50 is in constant mesh with a gear 51 fixed on a parallel shaft 52 (hereinafter called the "feed drive shaft") having integral with it a gear 53. A gear 54 splined on the spindle drive shaft is engageable either with the gear 49 or with the gear 53. When engaged with the gear 49, the spindle drive shaft is driven directly from the power drive shaft 30 but in an opposite direction. When the gear 54 is shifted into engagement with the gear 53, however, the spindle drive shaft is driven reversely from the feed drive shaft 52. It will be remembered that the traversing cam is driven by the spindle drive shaft. Thus, it is possible to change the direction of rotation of the winding spindle and its traversing cam according to the direction of twist of the yarn. The feed shaft, however, is always driven in the same direction.

To permit of easy removal of the clutch and brake unit, its input shaft 41 is journaled in a bearing member 55 removably secured in an opening 56 in a frame member 57 by means of bolts 58. The opening 56 is of a diameter greater than the diameters of the clutch housing 45 and brake housing 46 so that upon removal of the bolts 58 the clutch and brake unit may be removed with the bearing member 55 as permitted by the splined connection of the power drive shaft 30 with the gears 49, 50.

Shifting of the gear 54 axially of the spindle drive shaft so as to engage selectively with either of the gears 49 or 53 is accomplished manually. For this purpose, the gear 54 has rigid with it a shifting collar 59 (Fig. 7) engaged by a roller 60 eccentrically mounted on a disk 61 rigid with a stub shaft 62 journaled in the frame member 47. The stub shaft 62 is normally locked against rotation by interengaging clutch teeth 63 formed respectively on a stationary flanged sleeve 64 and on a disk 65 splined on the stub shaft and formed integral with a tubular member 66 forming a handle for rotating the stub shaft 62. A coiled spring 67 normally holds the teeth 63 engaged and when it is desired to shift the gear 54, the handle is shifted axially into the position shown in broken lines in Fig. 7 so as to disengage the teeth 63, whereupon the handle may be rotated through 180° to effect a shifting of the gear 54.

The feed shaft 24 is driven from the feed drive shaft 52 through speed change gearing generally designated 68 (Fig. 10) so that the rate of feed of the traverse slide 17 may be changed at will according to the size of the yarn being wound. Moreover, the drive includes a disengageable connection with the feed shaft 24, which connection is governed by the control mechanism so as to be engaged at the beginning of a winding cycle and disengaged at the end thereof.

As shown, the feed drive shaft 52 carries a worm 69 (Figs. 8 and 10) meshing with a worm wheel 70 rigid with a sleeve 71 journaled on a shaft 72 disposed at right angles to the shaft 52 and supported in bearings 73 and 74. Formed integral with the worm wheel 70 is a spur gear 75, and integral with the sleeve 71 is a spur pinion 76. A three-position shiftable gear cluster 77 has a pinion 78 movable into and out of mesh with the gear 75, and a gear 79 in sliding mesh with the pinion 76 so as to be engaged in the intermediate and lower positions of the cluster and disengaged in the third or upper position. Also, the gear cluster has a gear 80 in sliding mesh with a pinion 81 so as to be engaged in the intermediate and upper positions of the cluster and disengaged in the lower position. When the cluster is shifted from its intermediate to its lower position a pinion 82 thereon moves into mesh with a gear 83. The cluster is adapted to be shifted manually by means of a knob 68a and locked in its various positions by a detent pin 68b.

The pinion 81 and gear 83 are fixed with respect to each other and to a shaft 84 axially alined with the shaft 72, and this shaft 84 is connected by a pair of pick off gears 85 with a parallel worm shaft 86 carrying a worm 87 arranged to mesh with a worm wheel 88 (Fig. 2) on the feed shaft 24. The shaft 86 is mounted on a swinging frame 89 pivoted on a sleeve 90 coaxial with the shaft 84. By swinging the frame, the worm 87 may be moved into and out of mesh with the worm wheel 88 on the feed shaft.

Figure 2:
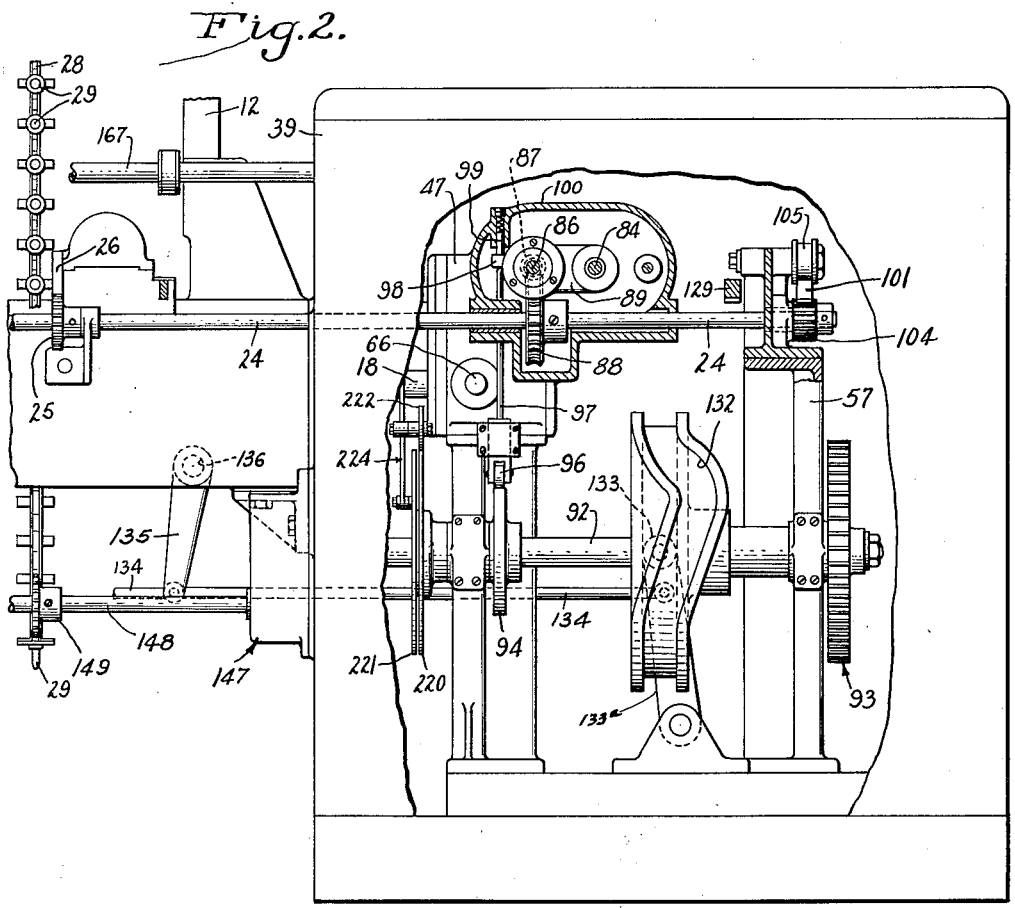
Fig. 2 is a fragmentary rear elevational view of the same portion of the machine and showing the rear wall of the housing broken away to expose the parts.

Referring now to Figs. 1, 2 and 6, the control mechanism comprises what constitutes in effect a cam shaft, although in the present embodiment of the invention it is made in two sections disposed in parallel relation lengthwise of the housing 39 and geared together for rotation in unison. For convenience herein, the two sections will be referred to as separate shafts designated respectively 91 and 92 (Fig. 6) connected by a spur gear train 93. Each shaft carries a plurality of cams respectively controlling the operation of various mechanisms or devices in the performance of the winding operation. Thus, the shaft 92 carries a cam 94 (Fig. 2) for engaging and disengaging the worm 87 from the worm 88 to govern the operation of the feed shaft 24 in advancing the traverse slide, and the shaft 91 carries a cam 95 (Fig. 6) for returning the traverse slide at the end of the winding operation.

For controlling the connection between the worm 87 and worm wheel 88, the cam 94 has a roller follower 96 carried by a vertically slidable push rod 97, the upper end of which engages a lug 98 on the pivotal frame 89. A spring pressed plunger 99 mounted in a stationary gear housing 100 tends to hold the worm 87 in engagement with the worm wheel 88.

As shown in Figs. 2 and 6, the cam 95 operates to return the traverse slide through the medium of a rack 101 pivoted at its forward end to the upper end of a lever arm 102 carrying a roller follower 103 for coaction with the cam. At its rear end, the rack 101 meshes with a spur gear 104 fast on the feed shaft 24, the rack being held in mesh with the pinion by a guide roller 105. In the advance of the traverse slide through its gearing connection with the clutch driven shaft 30, the rack bar 101 moves forwardly (Fig. 6). Accordingly, the cam 95 is especially shaped as shown in Fig. 6 to permit of such movement while the cam is in its normal rest position, and to cause return movement of the slide in the rotation of the cam shaft at the end of the winding operation.

It will be understood that during the winding operation the clutch collar 44 of the clutch and brake unit 31 occupies a position (Fig. 7) such that the clutch 42 is engaged and the brake 43 disengaged. When the bobbin has been completely wound, the collar is shifted so as to disengage the clutch and engage the brake. This is accomplished by a cam 106 on the shaft 91 through the medium of a shifting lever 107 having a cam follower 108. In the rest position of the cam shaft during the winding operation, the clutch lever 107 is positively held against movement by a cam member 109 on the cam 106, to insure that the clutch will remain engaged. Upon rotation of the shaft from such rest position, the cam follower 108 is engaged by a cam surface 110 so as to shift the clutch collar 44, disengage the clutch and apply the brake. Near the end of the winding operation, a cam member 111 on the cam 106 engages a cam follower to shift the collar 44 reversely.

During the return movement of the traversing slide following completion of the main winding operation, rotation of the winding spindle is continued at a slow speed in order to produce a backwind on the bobbin in the manner disclosed and claimed in my prior copending application, Serial No. 658,491, filed March 30, 1946, now Patent No. 2,569,661, dated October 2, 1951. Such rotation of the spindle is achieved notwithstanding the fact that the clutch 42 has been disengaged to interrupt the rotation of the spindle. It is for this purpose that the brake housing 46 is mounted for rotational movement.

Figure 3:
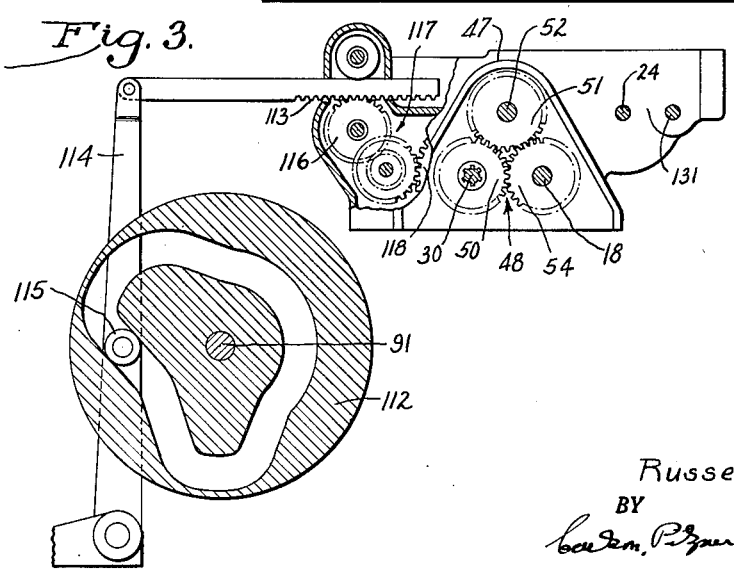
Fig. 3 is a fragmentary vertical sectional view taken approximately in the plane of line 3—3 of Fig. 1.

Referring now to Fig. 3, the shaft 91 carries a face cam 112 operative in the initial portion of the rotation of the shaft to actuate a rack 113 through the medium of a lever 114 and cam follower 115. The rack 113 meshes with a spur gear 116 forming part of a spur gear train 117, the other terminal gear 118 being formed integral with the brake housing. With the brake 43 engaged, the shaft 39 is connected to the brake housing so that in the rotation of the latter by the cam shaft a relatively slow rotational movement is imparted to the spindle drive shaft 18.

Upon the completion of the winding back operation, the centering slide 11 is actuated to release or doff the wound bobbin. For this purpose, the shaft 91 carries a face cam 119 (Fig. 4) acting upon a roller follower 120 on a lever 121. The lever has rigid with it a gear segment 122 meshing with a spur pinion 123 on a shaft 124. The latter extends lengthwise of the machine and carries at each of the winding units a spur pinion 125 (Fig. 5) meshing with rack teeth 126 formed on the centering slide 11. Subsequently, the cam 119 operates to advance the centering slide to engage a newly positioned empty bobbin for the succeeding cycle.

After the wound bobbin has been released and received in the underlying pocket 27, a shearing device (not shown) is actuated to shear the thread. This device may be of the character shown in my said Patent No. 2,445,998. Herein it is actuated by a cam 127 (Figs. 1 and 6) acting upon a lever 128 to actuate a rack bar 129. The rear end of the rack bar meshes with a pinion 130 on a shaft 131 which in turn serves to operate said shearing device in the manner described in said copending application.

Referring now to Figs. 1 and 2, the bobbin transfer device 14 is operated to transfer the wound bobbin into position in alinement with one of the pins 29 on the storage chain and to deliver an empty bobbin into winding position by means of a cam 132 on the shaft 92 (Fig. 2). The cam 132 acts upon a follower 133 on an arm 133a to which is pivoted a rod 134 extending longitudinally of the machine. At each of the winding units an arm 135 is connected to the rod 134 so as to rock a shaft 136 carrying a lever 137 (Fig. 1) forming part of the transfer device. At its upper end, the lever pivotally supports a notched carrier 138 for receiving empty bobbins. Also, the lever 137 is connected by a link 137a (Fig. 17) to the wound bobbin pocket 27, the latter being mounted upon a slide 139 guided on a support 139a for movement into alinement with an awaiting pin 29 on the storage chain.

Figure 4:
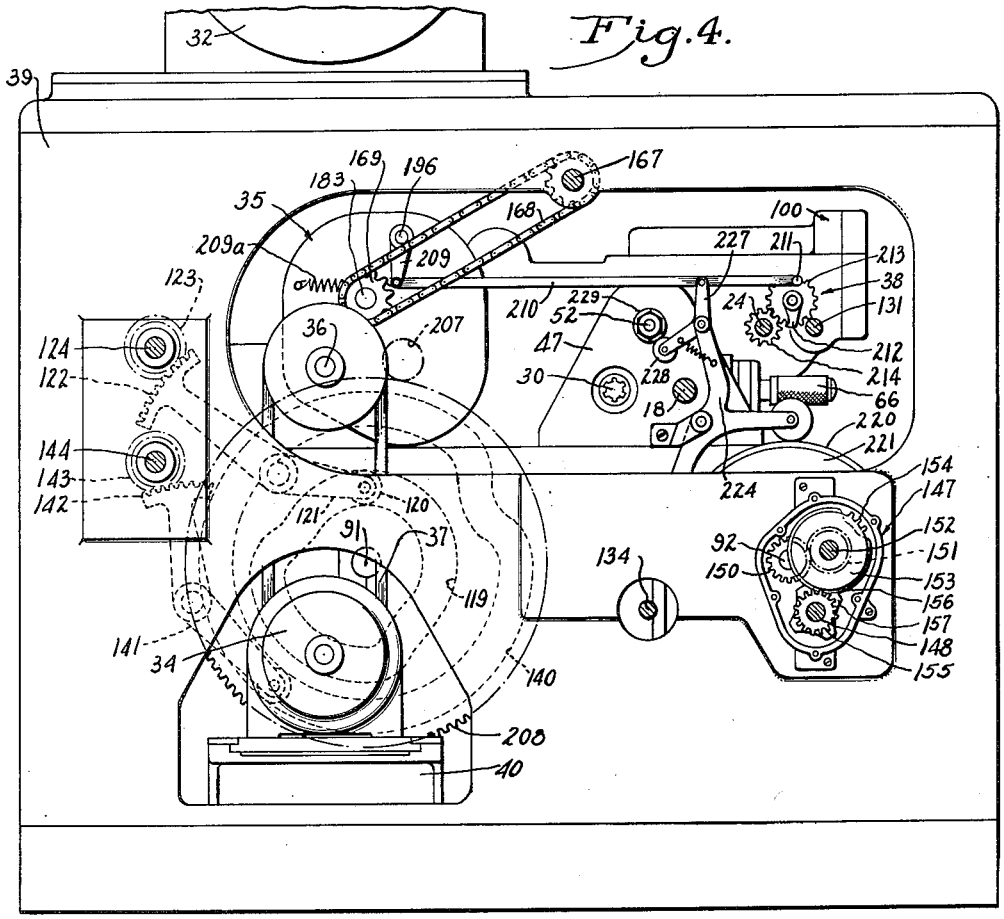
Fig. 4 is a fragmentary vertical sectional view taken approximately in the plane of line 4—4 of Fig. 1.

To advance the wound bobbin contained in the pocket 27 onto the awaiting pin 29, a cam 140 on the shaft 91 acts upon a follower lever 141 (Fig. 4). The latter has a gear segment 142 meshing with a pinion 143 on a rockshaft 144 extending longitudinally of the machine. At each of the winding units the shaft 144 carries a segment 145 (Fig. 5) meshing with a rack 146. When the slide 139 and its bobbin pocket are in position in alinement with the pin 29, the rack 146 is actuated to advance the pocket and the bobbin therein so as to transfer the bobbin to the storage chain in the manner set forth in my said Patent No. 2,445,998.

Following transfer of the wound bobbin to the storage chain, the latter is indexed one step by means driven from the rear cam shaft means 92. In this instance, the shaft 92 operates through a Geneva stop mechanism, generally designated 147 (Figs. 2 and 4) to drive a shaft 148 extending longitudinally of the machine and having at each winding unit a sprocket 149 engaging with the storage chain 28. The Geneva stop mechanism comprises a drive pinion 150 fast on the cam shaft 92 and meshing with a pinion 151 on a parallel shaft 152. The latter is rigid with a disk 153 carrying a gear segment 154 operative once in each revolution of the disk to impart a rotational movement to a pinion 155 fast on the shaft 148. Interengaging locking disks 156 and 157 on the shafts 148 and 152 respectively coact in the well known manner to hold the chain stationary between successive indexing cycles.

Preliminary to each winding cycle a small yarn mass commonly known as a bunch is wound upon the butt end of the bobbin. The means for accomplishing this result is generally similar to that disclosed in my copending application, Serial No. 627,175, filed November 7, 1945, now Patent No. 2,520,134, issued August 29, 1950, and comprises briefly a thread guiding pin 158 (Fig. 5) mounted on the lower end of a lever 159 pivotally supported on a bracket 160 carried by the slide 17. The lever 159 carries an arm 161 equipped with a cam member 162 which in the retracted position of the slide moves into operative association with a pin 163 on a bell crank 164, the arrangement being such that when the slide is in its retracted position with the traversing cam withdrawn to a position rearwardly of the bobbin an oscillating motion imparted to the bell crank is transmitted through the cam member 162 to the lever 159 to impart a short reciprocating stroke to the pin 158.

In the present instance, the bell crank 164 is reciprocated by power derived from the cam shaft so as to be operative only while the cam shaft is in operation instead of continuously as in my said prior application. For driving purposes, the bell crank 164 is actuated by an eccentric 165 having a link connection 166 with the bell crank. The eccentric is mounted on a shaft 167 extending lengthwise of the machine and driven by a chain and sprocket connection 168 (Fig. 4) having a sprocket 169 driven by the clutch unit 35 which drives the cam shaft.

The bunch building operation occurs just prior to the advance of the traversing cam from its retracted position to its winding position by the cam 95. Before the cam shaft comes to rest, the main clutch and brake unit 31 is actuated by the cam member 111 on the cam 106 to disengage the brake 43 and engage the clutch 42 to start rotation of the winding spindle. The point at which such operation of the clutch occurs with respect to the advance of the traversing cam from its retracted position determines the amount of yarn wound upon the butt end of the bobbin to form the bunch. In order that the size of the bunch may be varied at will, the cam member 111 is mounted for adjustment upon the cam disk 106.

As shown in Fig. 9, the cam member is mounted on an arcuate segment 170 secured to the disk by means of bolts 171 and 172 passing through slots in the segment and carried by the disk. It will be seen that by varying the position of the member 111 relative to the cam disk 106, the beginning of the main winding operation may be changed at will to vary the size of the bunch.

Figure 12:
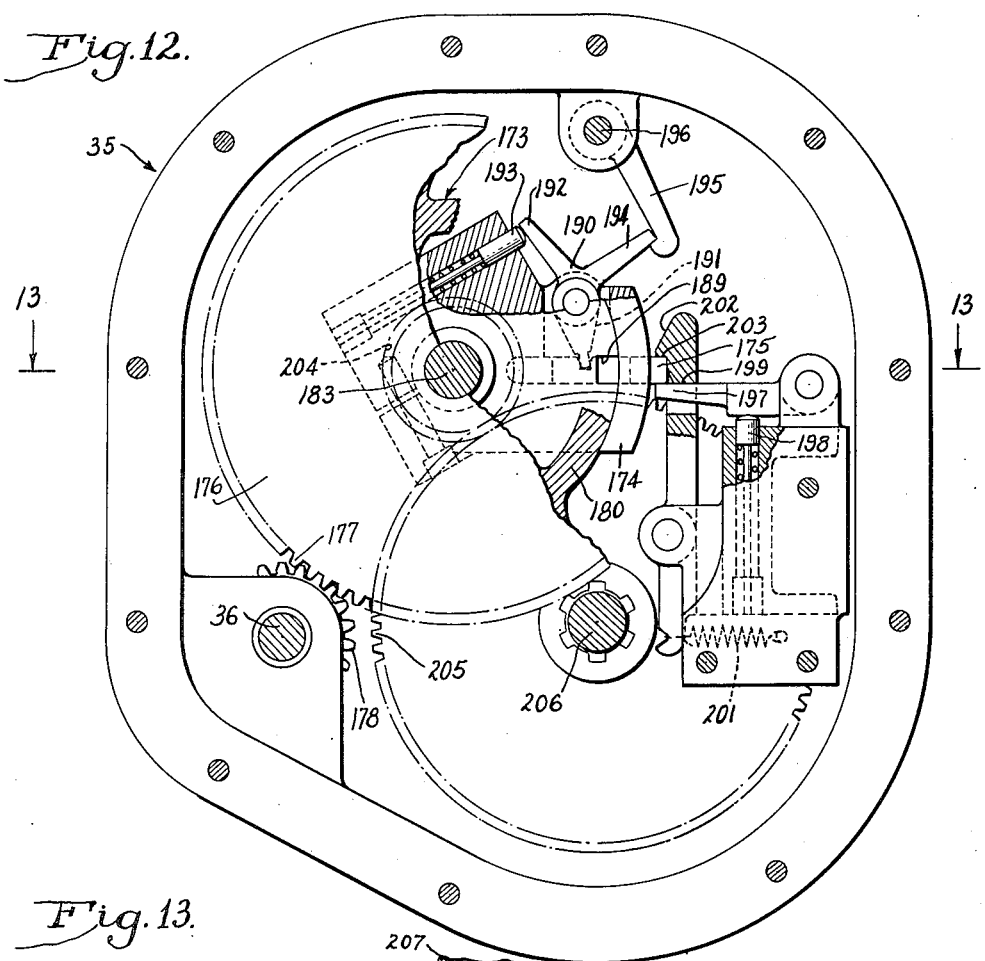
Fig. 12 is a fragmentary sectional view in the plane of line 12—12 of Fig. 1 and showing a disengageable clutch for driving the control mechanism.
Figure 13:
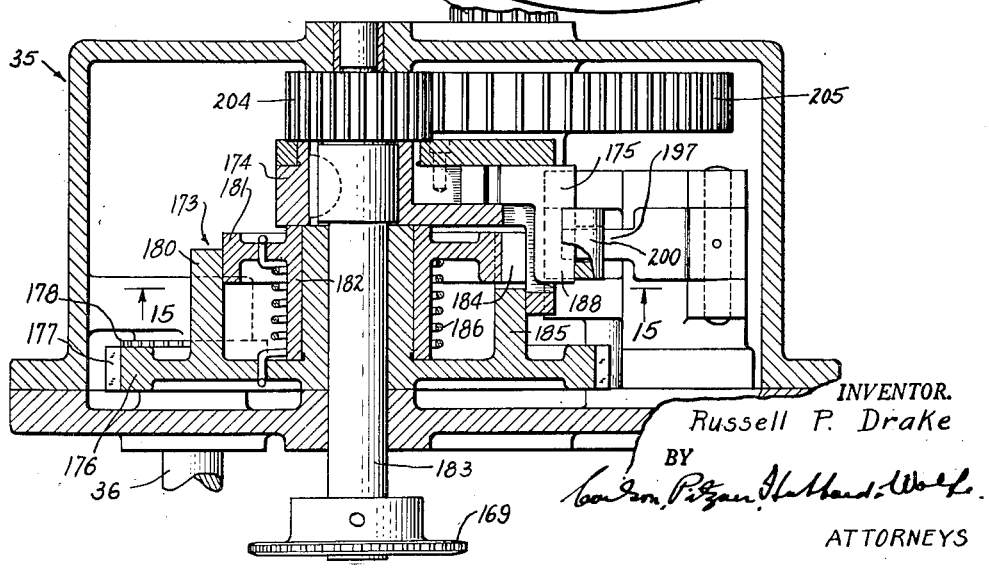
Fig. 13 is a horizontal section in the plane of line 13—13 of Fig. 12.

The quick engageable and disengageable clutch 35 (Figs. 12, 13 and 15) is of the general type disclosed in Colman Patent No. 2,013,649, issued September 10, 1935. It comprises, in general, a driver 173 (Fig. 13), a driven member 174 and a connecting member or bolt 175 providing a disengageable connection between the driver and driven member. The driver is connected with the motor 34 and comprises a disk 176 (Fig. 12) having gear teeth 177 on its periphery meshing with a drive pinion 178 on a shaft 36, the latter being driven by the belt and pulley connection 37. Rigid with the disk 176 is a sleeve 180 receiving a second disk 181 on a sleeve 182 which is journaled together with the disk 176 on a shaft 183. The disk 181 has a lug 184 (Fig. 15) projecting into a notch 185 in the sleeve 180, the width of the notch 185 being substantially greater than the width of the lug 184. A coiled torsion spring 186 urges the lug 184 against one end of the notch 185.

The shaft 183 carries the driven member 174, the latter being keyed to the shaft, and slidably mounted on the member 174 is the bolt 175 having a laterally projecting portion 188 for movement into and out of engagement with a notch 189 in the disk 181. Thus, in the innermost position of the bolt, a driving connection is established between the disk 181 and the driven member 174, and when the bolt is shifted outwardly to disengage the portion 188 from the notch 189, the driven member is disconnected from the driver.

The bolt is shifted into and out of engagement with the driver by means of an operating device comprising a three-pronged lever 190 (Fig. 12) having one finger 191 connected with the bolt and another finger 192 urged by a spring-pressed plunger 193 in a direction to shift the bolt inwardly or into driving connection with the driver. A third finger 194 of the lever is engageable with a control element in the form of a detent 195 on a rockshaft 196. When the detent is disposed in the path of the finger 194, the lever 190 is actuated against the action of the spring pressed plunger 193 to disengage the connection with the driver.

Means is provided for stopping the driven member 174 immediately upon disengagement of the driving connection. This means comprises a yieldable stop member 197 (Fig. 12) urged by a spring pressed plunger 198 against a stop 199 formed on a pivoted arm 200 and urged into operative position in opposed relation to the stop 197 by a spring 201. The arm 200 has an inclined cam surface 202 engageable by the bolt when the latter is in its withdrawn position so that in the movement of the bolt into engagement with the stop 197 the arm is swung out of the way and then promptly resumes its position whereupon a rebound shoulder 203 is engaged by the bolt.

It will be seen that the driver 173 rotates continuously and that the driven member may be stopped quickly and accurately positioned by movement of the detent 195 into engagement with the finger 194 of the operating lever 190 so as to shift the bolt into its disengaged position in which latter position it is stopped by the members 197, 200. The spring 186 serves to cushion the shock on the driver incident to the engagement of the bolt with the disk 181.

The driven shaft 183 is connected to the cam shaft 91 through reduction gearing including a pinion 204 on the shaft 183 meshing with a gear 205 fast on a shaft 206. Rigid with the latter shaft is a pinion 207 meshing with a gear 208 (Fig. 1) on the cam shaft 91. The shaft 183 projects from the opposite side of the housing and constitutes the drive shaft for the chain and sprocket mechanism 168 (Fig. 4) of the bunch builder actuating means.

Referring now to Figs. 14 to 16 inclusive, means is provided for controlling the starting and stopping of the cam shaft through the operation of the clutch detent 195. In general, this means operates in the normal cycle to start the cam shaft under the control of the feed mechanism at a predetermined point in the advance of the traversing slide, then after a relatively short movement of the cam shaft (approximately 20°) to stop it momentarily in an intermediate rest position to permit the winding spindle and traversing cam to come to rest before doffing the wound bobbin, next to restart the cam shaft in response to a decrease in the speed of rotation of the spindle, and finally to stop the shaft in its normal rest position and terminate the cycle.

Engagement of the clutch 35 under the control of the feed mechanism to start the cam shaft is effected positively by means operatively associated with the feed shaft 24 so as to be actuated in definite timed relation to the advance of the traversing slide, which it will be remembered is driven at varying speeds dependent on the size of the yarn being wound. As shown in Fig. 14, the clutch detent 195 is rigid with an arm 209 urged by a spring 209a to hold the detent 195 in engaged relation to the operating finger 194. The free end of the arm 209 is attached to the rear end of a trip bar 210 carrying on its forward end a pin 211 disposed in the path of movement of a bifurcated trip finger 212 driven by a gear 213 meshing with a pinion 214 on the feed shaft 24. As shown in Fig. 10, the trip finger 212 has a yieldable lost motion connection 215 with the gear 213. Thus, the finger is made integral with a disk 216 and the hub 217 of the gear 213 is notched to receive a boss 218 on the disk, the boss being held against one end of its notch by a coiled torsion spring 219. The purpose of this yieldable lost motion connection between the finger and its drive gear 213 will presently become apparent.

Upon the completion of the winding operation, the trip finger 212 moves into engagement with the pin 211 and through the trip bar 210 and lever arm 209, the control detent 195 is withdrawn from engagement with the clutch operating finger 194, releasing the lever 190 to the action of its spring pressed plunger 193 thereby causing the bolt 187 to be shifted out of engagement with its stop 197 and into engagement with the driver 173 of the clutch. As a result, the cam shaft is started and through the operation of the cam 106 the main drive clutch 42 is disengaged and the brake 43 engaged.

Movement of the trip bar 210 by the cam shaft in the initial portion of its rotational movement is accomplished by a pair of cams 220 and 221 on the cam shaft respectively cooperating with rollers 222 and 223 on a pivoted follower 224 operatively connected with the trip bar. The follower comprises a three-armed member having two arms 225 and 225a respectively carrying the rollers 223 and 222, and a third arm 226 pivotally connected to and arranged to actuate a lever 227. The latter has one arm pivoted to the trip bar 210 and its other arm equipped with a roller 228 normally bearing against a collar 229 on the feed drive shaft 52 (Fig. 10).

In Fig. 14, the parts are shown in the position occupied during the winding operation and just prior to the engagement of the clutch 35 by the trip finger 212 acting upon the trip bar 210. The positions occupied by the parts following movement of the bar by the trip finger to engage the clutch are shown in broken lines in Fig. 14. It will be observed that in the normal position of the follower, the roller 223 is received in a recess 231 in the cam disk 221 and that the roller 222 occupies a position spaced a short distance from its disk 220. Thus the follower is capable of being rocked on its pivot in the ensuing operation of the trip bar 210 by the trip finger 212. To permit of relative rotational movement in one direction between the lever 227 and the follower 224 due to such operation of the trip bar, the lever has a yieldable lost motion connection with the follower comprising interengaging stops 232 and 233 on the lever and follower respectively, and a spring 234 tending to hold the stops in engagement.

After the cam shaft has rotated through a short arc and before the cam 95 operates to return the traverse slide, the roller 223 on the follower moves onto a dwell surface 235 on the cam 221, shifting the roller 222 into engagement with a dwell surface 236 on the cam disk 220. Thereupon, a lobe 237 on the disk 220 engages the roller 222 concurrently with the movement of the roller 223 into a recess 238 on the cam disk 221. The follower is thus shifted reversely (Fig. 16) so as to act upon the lever 227 fulcrumed on the collar 229 to shift the trip bar 210 to the left and carry the control detent 195 into the path of the finger 194 of the clutch 35 to disengage the drive to the cam shaft. Such shifting movement of the trip bar 210 occurs against the action of the spring 219 (Fig. 10) as permitted by the lost motion connection between the trip finger 212 and the gear 213, it being remembered that at this time the traverse slide has not been returned and that therefore the gear 213 is held stationary by its connection with the feed shaft 24.

The cam shaft being now stationary as a result of the disengagement of the clutch 35 and the feed shaft also being in a position of rest, other means is employed to restart the cam shaft from its intermediate stop position and, as above indicated, this means is responsive to the speed of the winding spindle. For this purpose, energy stored in the spring 219 as an incident to the movement of the trip bar 210 to the left by the cam lobe 237 is utilized, and the movement of the bar is initiated by a speed responsive device 239 (Figs. 10 and 11) for actuating the collar 229 so as to shift it out of the plane of the fulcrum roller 228, thereby releasing the lever 227 to the force of the spring 219 acting through the medium of the trip finger 212. Such movement of the bar occurs against the action of the springs 209a and 234 which are relatively weak.

The speed responsive device 239 comprises a disk 240 (Fig. 11) fast on the feed drive shaft 52 (Fig. 10). Weights 241 mounted on the disk act through arms 242 to shift a sleeve 243 axially of the shaft 52 against the action of a coiled compression spring 244. The collar 229 is formed integral with the sleeve and during the winding operation the weights act to position the collar in the plane of the fulcrum roller 228 of the lever 227. When, however, the speed of rotation of the winding spindle is reduced substantially following disengagement of the main drive clutch 42, the collar 229 is withdrawn by the spring 244 out of the plane of the fulcrum roller 228 so as to render the spring 219 effective to actuate the trip bar and withdraw the detent 195 from the clutch operating finger 194.

Immediately after the cam shaft has been restarted, the roller 223 moves out of its recess 238 and engages a long dwell 245 on the cam disk 221 so that the lever 226 is held in position to retain the detent 195 in disengaged relation to the clutch finger 194. At the end of the cam shaft cycle, the recess 231 on the cam 221 receives the roller 223 (Fig. 14) and permits movement of the lever 226 and of the trip bar 210 by the spring 209a into the path of rotation of the finger 194 thereby stopping the cam shaft.

The operation, as above described, whereby the clutch 35 is controlled for starting and stopping purposes is the normal mode of operation. Thus it has been found in practice that following disengagement of the main clutch in the initial portion of the cam shaft cycle and the ensuing engagement of the brake, the winding spindle is not brought to rest with sufficient rapidity to cause the speed responsive device 239 to withdraw the collar 229 in advance of the actuation of the follower 226 by the cam lobe 237. This is especially for the reason that the engagement of the brake 43 is utilized to continue the rotation of the winding spindle through the rotation of the brake housing 46. Under some conditions, however, the means for stopping the cam shaft in its intermediate rest position may be rendered ineffective so that the cam shaft when once started from its normal rest position will continue uninterruptedly throughout its complete cycle. This will occur in the event that the speed of the winding spindle is reduced rapidly following disengagement of the main clutch so as to cause withdrawal of the fulcrum collar 229 from the lever roller 228 before the cam lobe 237 on the cam 220 engages with the follower 224. In such event, the follower when actuated by the cam lobe 237 is rendered ineffective to swing the lever 227 and therefore ineffective to shift the trip bar 210 in a direction to carry the detent 195 into the path of the clutch operating finger 194. Thus, it will be seen that the speed responsive device and its associated mechanism constitutes a safety device ensuring stoppage of the winding spindle before the release of the wound bobbin.

The timing of the various operations by the cam shaft is such that upon the completion of the winding operation the feed means is disengaged, the traverse cam slide is returned, the wound bobbin released by the withdrawal of the centering slide 11 so as to be deposited in the trough or pocket 27, the thread is cut off and the transfer device 14 is operated to place the wound bobbin in alinement with a pin on the storage chain and at the same time to deliver an empty bobbin from the magazine into the winding position. The pocket 27 is then shifted to transfer the wound bobbin therein onto the awaiting pin 29, whereupon the storage chain is indexed one step, the transfer device 14 returned, the centering slide 11 actuated to grip a new bobbin and the traversing cam slide advanced to its winding position for the next cycle. In accordance with my invention, the advancing movement of the traversing slide in the succeeding cycle is utilized to mark the previously wound bobbin now on the storage chain so as to place a mark upon the bobbin for purposes of identification.

Referring now to Figs. 17 to 19, inclusive, I have shown applied to the traversing slide a marking device generally designated 246 comprising in general a container 247 for a suitable dye, and a wick 248 projecting from the lower end of the container. As shown in Fig. 17, the storage chain travels in a vertical path disposed at one side of the winding spindle in closely spaced relation thereto, and the marking device 246 is mounted on the side of the traversing slide 17 adjacent the chain so that the wick may be supported in position for engagement with the wound bobbin which has been delivered to the chain and indexed one step, as above indicated.

Referring now to Fig. 18, the container 247 of the marking device is preferably made of glass or a suitable plastic material. It is in the form of an elongated tube closed at its upper end and open at its lower end to receive a cork or stopper 249. The latter is apertured to receive a wick and the upper end portion of the latter projects upwardly into the container so as to be immersed in a dye 250. The lower end of the wick is supported by means of a spring finger 251 on a clip 251a applied to the stopper 249, the finger being adapted to support the wick in a position extending downwardly and laterally from the traversing slide for engagement with the wound bobbin on the chain.

The device may be supported in any suitable or preferred manner upon the traversing slide. As herein shown, it is carried by an angle bracket 252 mounted on the top of the slide and extending downwardly along one side thereof. A spring clip 253 is secured to the depending portion of the bracket and engages the upper portion of the container. To prevent collapse of the latter, especially when made of a plastic material, the container is provided with an inner metallic sleeve 254. The spring clip 251a is additionally secured to the bracket and by its engagement with the lower projecting end portion of the stopper 249 provides an additional support for the device.

It will be seen that in the advance of the traversing slide during the operation of winding one bobbin, the marking device is operative upon the previously wound bobbin, the latter having been transferred to the storage chain in the operation of the control mechanism following the operation of winding the latter bobbin. The arrangement is especially advantageous in that the marking operation is accomplished wholly as an incident to the performance of other operations and while the bobbins are firmly supported, thereby insuring a proper marking contact between the marking element or wick and the bobbin.

I claim as my invention:

1. In a bobbin winding machine, drive mechanism including a prime mover and a main drive shaft having a disengageable connection with said prime mover including a clutch, a winding mechanism including a spindle operatively connected with said drive shaft, a yarn traversing device mounted for feeding movement longitudinally of the spindle, feed means having a disengageable connection with said drive shaft for imparting a gradual feeding movement to said traversing device, and a control mechanism including a cam shaft having a rest position, means including a cam on said shaft operative in the rest position thereof to hold said clutch engaged to effect rotation of the spindle and the advance of the traversing device in the operation of winding a bobbin, means actuated positively by said drive mechanism at a predetermined point in the advance of the traversing device to start said cam shaft from its said rest position, and means including cams on said shaft for disengaging said clutch to stop the drive shaft, disengaging the feed mechanism, returning the traverse slide to its initial position and stopping the cam shaft in its said rest position.

2. In a bobbin winding machine, drive mechanism including a prime mover and a main drive shaft having a disengageable connection with said prime mover including a clutch, a winding mechanism including a spindle operatively connected with said drive shaft, a yarn traversing device mounted for feeding movement longitudinally of the spindle, feed means having a disengageable connection with said drive shaft for imparting a gradual feeding movement to said traversing device, and a control mechanism including a cam shaft having a rest position, means holding said clutch engaged while the cam shaft is in its said rest position to effect rotation of the spindle and the advance of the traversing device in the operation of winding a bobbin, means actuated positively by said drive mechanism at a predetermined point in the advance of the traversing device to start said cam shaft from its said rest position and means including cams on said shaft to disengage said clutch to stop the drive shaft, disengage the feed mechanism, return the traverse slide to its initial position and stop the cam shaft in its said rest position.

3. In a bobbin winding machine, drive mechanism including a prime mover and a main drive shaft having a disengageable connection with said prime mover including a clutch, a winding mechanism including a spindle operatively connected with said drive shaft, a yarn traversing device mounted for feeding movement longitudinally of the spindle, feed means having a disengageable connection with said drive shaft for imparting a gradual feeding movement to said traversing device, and a control mechanism including a cam shaft having a rest position, means holding said clutch engaged while the cam shaft is in its said rest position to effect rotation of the spindle and the advance of the traversing device in the operation of winding a bobbin, said cam shaft having a drive motor and a clutch disengageably connecting the shaft to the motor, means actuated positively by said drive mechanism at a predetermined point in the advance of the traversing device to actuate the cam shaft clutch to start the cam shaft from its said rest position, and means including cams on said shaft to disengage the first mentioned clutch to stop the drive shaft, disengage the feed mechanism, return the traversing device to its initial position and actuate the second mentioned clutch to stop the cam shaft in its said rest position.

4. A bobbin winding machine having, in combination, a winding mechanism including a spindle and a yarn traversing device mounted for movement axially of the spindle, power driven means having a disengageable driving connection with the spindle and said traversing device, and a control mechanism for said power driven means including a driven shaft, a prime mover and a quick engageable and disengageable clutch connecting said shaft with said prime mover, said clutch having a shiftable control element operative to cause engagement and disengagement of the clutch, means operative at a predetermined point in the movement of said traversing device by said power driven means while the driving connection therefor remains engaged to shift said control element in one direction to engage said clutch, and means operative at a predetermined point in the rotation of said shaft to shift said element in an opposite direction so as to effect disengagement of the clutch.

5. In a bobbin winding machine, a winding mechanism including a spindle and a yarn traversing device mounted for feeding movement longitudinally of the spindle, drive means for rotating said spindle and advancing said traversing device including a prime mover and a clutch, a cam shaft having a rest position during the advance of the traversing device and the rotation of the spindle, means actuated positively by said drive means at a predetermined point in the advance of the traversing device to start said cam shaft from its said rest position, and means including cams on said shaft for actuating said clutch to stop the spindle, disengage the feed mechanism, return the traverse slide to its initial position, actuate the clutch to restart the drive shaft, and stop the cam shaft in its rest position.

6. In a bobbin winding machine, a winding mechanism including a winding spindle and a yarn traversing device mounted for movement longitudinally of the spindle, power driven means for driving said spindle and said traversing device, and control means for said winding mechanism including a cam shaft, a motor for driving said shaft, a clutch controlling the connection between the motor and the shaft, said clutch having a shiftable control element, means operative at a predetermined point in the advance of the traversing device to shift said control element mechanically in one direction whereby to initiate rotation of the cam shaft by said clutch, and cam means on said shaft for shifting said control element in an opposite direction whereby to interrupt rotation of the shaft by said clutch.

7. In a bobbin winding machine, a winding spindle, a traversing device mounted for movement longitudinally of the spindle, drive means having a main disengageable driving connection with said spindle and said traversing device, and a control mechanism operative automatically to interrupt one winding operation and to start a succeeding operation, said control mechanism including a cam shaft, a clutch disengageably connecting said cam shaft with a source of power and comprising a driver, a driven member, a connecting member, an operating device therefor and a control element shiftable into and out of engagement with said operating device to cause said connecting member to disengage and engage said clutch, means operative at a predetermined point in the advance of the traversing device by said power driven means while the said driving connection therefor remains engaged to start said cam shaft, means operated by said cam shaft to disengage said driving connection, and means on the shaft for actuating said control element to interrupt rotation of the shaft at a predetermined point in the rotation thereof.

8. In a bobbin winding machine having a winding spindle and a yarn traversing device, a control mechanism comprising a cam shaft and a clutch governing the operation of the cam shaft comprising a driver, a driven member, a connecting member spring biased into a position to connect the driver and driven member, an operating device mounted on the driven member for rotation therewith, a control device movable into and out of the path of rotation of the operating device whereby to shift said control element into position to disconnect said driver and driven member, and a yieldable stop engageable with the connecting member upon movement of the latter into its disconnecting position so as to stop the driven member in a predetermined position.

9. In a bobbin winding machine having a winding spindle and a yarn traversing device, a control mechanism comprising a cam shaft and a clutch governing the operation of the cam shaft comprising a driver, a driven member, a connecting member spring biased into a position to connect the driver and driven member, an operating device mounted on the driven member for rotation therewith, a control device movable into and out of the path of rotation of the operating device whereby to shift said control element into position to disconnect said driver and driven member, a yieldable stop engageable with the connecting member upon movement of the latter into its disconnecting position so as to stop the driven member in a predetermined position, and means operating under the joint control of said traversing device and said cam shaft for actuating said control device whereby to start and stop the cam shaft.

10. In a bobbin winding machine, a winding mechanism including a winding spindle and a yarn traversing device mounted for axial movement of the spindle, feed means for advancing said traversing device including a feed shaft, power driven means for said feed shaft including a variable speed transmission, and control means for said winding mechanism including a cam shaft, a motor for driving said shaft, a clutch controlling the connection between the motor and the cam shaft, said clutch having a shiftable control element, a member driven by said feed shaft and operative at a predetermined point in the advance of the traversing device to shift said clutch control element whereby to initiate rotation of the cam shaft by said clutch, means actuated by the cam shaft for interrupting the operation of said feed means by said power driven means, and cam means on said cam shaft for again shifting said control element whereby to interrupt rotation of the shaft by said clutch.

11. In a bobbin winding machine, a winding mechanism including a spindle and a yarn traversing device mounted for movement axially of the spindle, feed means for advancing the traversing device along the spindle, a variable speed drive mechanism for said feed means, and control means for said winding mechanism including a cam shaft, a motor for driving said shaft, a clutch controlling the connection between the motor and the shaft, said clutch having a shiftable control element, a member driven by said feed means having a yieldable lost motion connection with said control element and operative at a predetermined point in the advance of the traversing device to shift said control element in a direction to engage said clutch to start the cam shaft, said connection including a spring, a lever operatively connected with the control element, a shiftable fulcrum for said lever, and means, 2,619,295

17 operable in the rotation of the cam shaft to swing said lever on its said fulcrum to cause disengagement of said clutch and to energize said spring, said fulcrum being shiftable to permit movement of said lever by said spring whereby to effect reengagement of said clutch.

12. In a bobbin winding machine, a winding mechanism including a winding spindle and a yarn traversing device mounted for movement axially of the spindle, feed means for advancing said traversing device, power driven means including a main clutch for actuating said feed means and for driving said spindle, and control means for said winding mechanism including a cam shaft and a second clutch controlling the connection of said shaft with a source of power and having a shiftable control element, a member driven from said feed means and operative at a predetermined point in the advance of the traversing device to shift said control element in a direction to engage said second clutch and start the cam shaft, means on the cam shaft for disengaging said main clutch to stop the spindle, a lever operatively connected with the control element, a fulcrum for said lever, cam means on said shaft operative to shift said control element in a direction to disengage the second clutch, a spring tensioned on the last mentioned movement of the control element, a speed responsive device connected with the spindle drive means and operative upon a predetermined reduction in speed of the spindle to shift said fulcrum whereby to release said lever and said control element to the action of said spring whereby to reengage said second clutch to restart the cam shaft, and means operative in the continued rotation of the cam shaft to shift said control element in a direction to again disengage said second clutch and stop the cam shaft.

13. In a bobbin winding machine, a winding mechanism including a winding spindle and a yarn traversing device mounted for movement axially of the spindle, feed means for advancing the traversing device, a power drive means having a disengageable driving connection with said feed means, and control means for said winding mechanism including a cam shaft, a motor for driving said shaft, a clutch for connecting the motor and the shaft, said clutch having a shiftable control element, a member driven by said feed means and operative to shift said control element at a predetermined point in the advance of the traversing device to cause engagement of said clutch whereby to start the cam shaft, said member having a yieldable lost motion connection with the feed means including a spring, a lever operatively connected with the control element, a fulcrum for said lever, means operative in the rotation of the cam shaft to swing said lever on its said fulcrum so as to shift said control element in a direction to cause disengagement of said clutch and to energize said spring, said fulcrum being shiftable to release said lever and render said spring effective to shift the control element in a direction to engage said clutch and restart the cam shaft, and means operative in the continued rotation of the cam shaft to shift said control element in a direction to disengage said clutch.

14. In a bobbin winding machine, a winding mechanism including a winding spindle, power driven means for rotating said spindle including a main clutch, and control means including a cam shaft and a second clutch controlling the

18 connection of said shaft with a source of power and having a shiftable control element, means operative at the end of a winding operation to shift said control element in a direction to engage said second clutch and start the cam shaft, cam means operative in the rotation of said shaft to disengage said main clutch and to operate said control element to disengage said second clutch and stop the cam shaft, and means for restarting the cam shaft including a device responsive to a reduction in speed of the winding spindle following disengagement of the main clutch.

15. In a bobbin winding machine, a winding mechanism including a winding spindle and a yarn traversing device mounted for movement longitudinally of the spindle, power driven means for rotating said spindle, including a main clutch, feed means actuated by said power driven means, and control means including a cam shaft and a second clutch controlling the connection of said shaft with a source of power and having a shiftable control element, means driven by said feed means and operative at a predetermined point in the advance of the traversing device to shift said control element in a direction to engage said second clutch and start the cam shaft, cam means operative in the rotation of said shaft to disengage said main clutch and to operate said control element to disengage said second clutch and stop the cam shaft, and means for restarting the cam shaft including a spring energized in the movement of the control element by the cam shaft in stopping the latter and a device responsive to the speed of rotation of the spindle upon disengagement of the main clutch adapted to render said spring effective to restart the cam shaft.

16. In a bobbin winding machine, a winding mechanism including a winding spindle and a yarn traversing device mounted for movement longitudinally of the spindle, power driven means for rotating said spindle, including a main clutch, feed means actuated by said power drive means, and control means including a cam shaft and a second clutch controlling the connection of said shaft with a source of power and having a shiftable control element, means driven by said feed means and operative at a predetermined point in the advance of the traversing device to shift said control element in a direction to engage said second clutch and start the cam shaft, cam means operative in the rotation of the cam shaft to disengage the main clutch and to shift said control element and cause disengagement of said second clutch whereby to stop the cam shaft, a spring energized in the last mentioned movement of the control element, and a device connected with said drive means and operative automatically as an incident to a predetermined reduction in speed of the winding spindle following disengagement of the main clutch to release said control element to the action of said spring whereby to engage the second clutch and restart the cam shaft.

17. In a bobbin winding machine, a winding mechanism including a winding spindle and a yarn traversing device mounted for movement longitudinally of the spindle, power drive means for rotating said spindle including a main clutch, feed means having a driving connection with said power drive means, and control means for said winding mechanism including a cam shaft and a second clutch controlling the connection of said shaft with a source of power and having a shiftable control element, means operative at a predetermined point in the advance of the traversing device by said feed means to actuate said control element and cause engagement of said second clutch to start the cam shaft, means operable in the rotation of the cam shaft to disengage said main clutch, a lever connected with said control element and having a shiftable fulcrum, means actuated in the rotation of the cam shaft for swinging said lever on its said fulcrum so as to shift said control element in a direction to disengage the second clutch to stop the cam shaft, a spring energized in the movement of the control element by said lever, and a speed responsive device connected with said power means and operative to shift said fulcrum to render said spring effective to shift the control element in a direction to restart the cam shaft.

18. In a bobbin winding machine, a winding mechanism including a winding spindle and a yarn traversing device mounted for movement longitudinally of the spindle, power drive means for rotating said spindle including a main clutch, feed means having a driving connection with said power drive means, and control means for said winding mechanism including a cam shaft and a second clutch controlling the connection of said shaft with a source of power and having a shiftable control element, means operative in the advance of the traversing device by said feed means to actuate said control element so as to engage said second clutch and start the cam shaft, means actuated in the rotation of the cam shaft to disengage said main clutch, means for disengaging the second clutch to stop the cam shaft in an intermediate rest position including a lever operatively connected with the control element, a cam on said shaft and a follower for said cam pivotally connected with said lever, said lever having a shiftable fulcrum, a spring energized in the movement of the control element by said lever, and a speed responsive device connected with the power drive means and operative upon disengagement of said main clutch to shift said fulcrum so as to render said spring effective to move the control element so as to cause engagement of said second clutch whereby to restart the cam shaft.

19. In a bobbin winding machine, a winding mechanism including a winding spindle and a yarn traversing device mounted for movement longitudinally of the spindle, power drive means for rotating said spindle including a main clutch, feed means having a driving connection with said power drive means, and control means for said winding mechanism including a cam shaft and a second clutch controlling the connection of said shaft with a source of power and having a shiftable control element, means operative in the advance of the traversing device by said feed means to actuate said control element so as to engage said second clutch and start the cam shaft, means actuated in the rotation of the cam shaft to disengage said main clutch, means for disengaging the second clutch to stop the cam shaft in an intermediate rest position including a lever operatively connected with the control element, a cam on said shaft and a follower for said cam operatively associated with said lever, said lever having a shiftable fulcrum, a spring energized in the movement of the control element by said lever, a speed responsive device connected with the power drive means and operative upon disengagement of said main clutch to shift said fulcrum so as to render said spring effective to move the control element so as to cause engagement of said second clutch whereby to restart the cam shaft, and cam means operative upon said follower in the continued rotation of the cam shaft to shift said control element in a direction to stop the cam shaft.

20. In a bobbin winding machine, a winding mechanism including a winding spindle and a yarn traversing device mounted for movement longitudinally of the spindle, power drive means for rotating said spindle including a main clutch, feed means having a driving connection with said power drive means, and control means for said winding mechanism including a cam shaft and a second clutch controlling the connection of said shaft with a source of power and having a shiftable control element, means operative in the advance of the traversing device by said feed means to actuate said control element so as to engage said second clutch and start the cam shaft, means actuated in the rotation of the cam shaft to disengage said main clutch, a device responsive to the speed of rotation of the spindle upon disengagement of the main clutch, and means controlled jointly by said cam shaft and said speed responsive device for actuating said second clutch to stop the cam shaft in a predetermined rest position and to restart the cam shaft from said rest position.

21. In a bobbin winding machine comprising a winding spindle having a disengageable driving connection with a source of power and a yarn traversing device, a control mechanism comprising a cam shaft, a clutch for connecting the cam shaft to a source of power, a device responsive to the speed of rotation of the spindle, and means operating under the joint control of the traversing device, said cam shaft and said speed responsive device to start the cam shaft, to stop it in a predetermined rest position, to restart the cam shaft and finally to stop the cam shaft at the end of a predetermined cycle.

22. In a bobbin winding machine, winding mechanism including a spindle, drive means for said spindle including a clutch and brake unit, and a rotary controller having a clutch for connecting the same to a source of power and operative to govern the winding mechanism so as to cause bobbins to be wound in succession, means operative upon the completion of one winding operation to start said controller from a normal rest position, means operable in the rotation of the controller to actuate said clutch and brake unit so as to disengage the clutch and apply the brake, a device responsive to the speed of rotation of the spindle, and means operative under the joint control of the controller and said speed responsive device to interrupt rotation of the controller in an intermediate rest position and to restart the same, said speed responsive device being operative to render the controller ineffective to effect stoppage thereof in the event that the speed of the spindle has been reduced to a predetermined minimum in advance of the arrival of the controller in said intermediate rest position.

23. In a bobbin winding machine, a winding mechanism including a spindle, power means for driving the spindle including a clutch and brake unit, and control means to effect the operation of the winding mechanism in successive cycles comprising a cam shaft having a clutch disengageably connecting it to a source of power, said cam shaft having a normal rest position, means operable upon the completion of one winding operation to start the cam shaft from its normal rest position and to actuate said clutch and brake unit whereby to disengage the clutch and apply the brake, means operable in the rotation of the cam shaft to stop it in an intermediate rest position and a device responsive to the speed of the winding spindle and acting upon a predetermined reduction in the speed of the winding spindle to render ineffective the means for stopping the cam shaft in said intermediate position.

24. In a bobbin winding machine, a winding mechanism including a spindle, power means for driving the spindle including a clutch and brake unit, and control means to effect the operation of the winding mechanism in successive cycles comprising a cam shaft having a clutch disengageably connecting it to a source of power, said cam shaft having a normal rest position, means operable upon the completion of one winding operation to start the cam shaft from its normal rest position and to actuate said clutch and brake unit whereby to disengage the clutch and apply the brake, means operable in the rotation of the cam shaft to stop it in an intermediate rest position and means for rendering the last mentioned means ineffective.

25. In a bobbin winding machine, a winding mechanism comprising a spindle, a support mounted for movement longitudinally of the spindle and having main and auxiliary yarn traversing devices mounted thereon, feed means for advancing said support, power driven means for actuating said winding mechanism, said feed means and said support including a main clutch, a cam shaft having a clutch disengageably connecting it with a source of power, means operable in the advance of said support to actuate the second mentioned clutch to start the cam shaft, mechanism operable by the cam shaft to disengage said feed means, actuate said main clutch to interrupt the operation of the winding spindle, return the support to a withdrawn position rearwardly of the bobbin on the spindle, reengage said main clutch to restart the spindle, impart a short advancing movement to the support, reengage the feed mechanism and stop the cam shaft, and means operable in the rotation of the cam shaft for actuating the auxiliary traversing device during the short advancing movement of the support from its said retracted position.

26. In a bobbin winding machine, a winding mechanism comprising a spindle, a support mounted for movement longitudinally of the spindle and having main and auxiliary yarn traversing devices mounted thereon, feed means for advancing said support, power driven means for actuating said winding mechanism, said feed means and said support including a main clutch, a cam shaft having a clutch disengageably connecting it with a source of power, means operable in the advance of said support to actuate the second mentioned clutch to start the cam shaft, mechanism operable by the cam shaft to disengage said feed means, actuate said main clutch to interrupt the operation of the winding spindle, return the support to a withdrawn position rearwardly of the bobbin on the spindle, reengage said main clutch to restart the spindle, impart a short advancing movement to the support, reengage the feed mechanism and stop the cam shaft, and means operable in the rotation of the cam shaft for actuating the auxiliary traversing device during the short advancing movement of the support from its said retracted position, said cam shaft mechanism including a cam adjustable relative to the shaft to vary the time of reengagement of the main clutch.

27. A bobbin winding machine having, in combination, a winding mechanism comprising a spindle having a bobbin chuck, a support mounted for movement longitudinally of the spindle and having main and auxiliary traversing devices thereon, feed means for advancing said support, power driven means for actuating said winding mechanism, said feed means and said support including a main clutch, and a control mechanism governing the operation of said winding mechanism in successive cycles including means for actuating said main clutch to start the spindle and impart a short advancing movement to the support from a position rearwardly of said chuck, and means operable during such advance of the support to actuate said auxiliary traversing device.

28. A bobbin winding machine having, in combination, a winding mechanism comprising a spindle having a bobbin chuck, a support mounted for movement longitudinally of the spindle and having main and auxiliary traversing devices thereon, feed means for advancing said support, power driven means for actuating said winding mechanism, said feed means and said support including a main clutch, and a control mechanism governing the operation of said winding mechanism in successive cycles including means for actuating said main clutch to start the spindle and impart a short advancing movement to the support from a position rearwardly of said chuck, and means operable during such advance of the support to actuate said auxiliary traversing device, the means for starting the spindle being adjustable to vary the time of starting of the spindle with respect to the advance of the support.

29. In a winding machine having a yarn traversing device and a feed mechanism therefor, a control mechanism comprising a rotary controller with drive means therefor including a rotary drive member, a driven member connected with the controller and a connecting element mounted on the driven member and movable into and out of driving relation to the driving member, spring means urging said connecting element toward engagement with the driving member, stop means operative in the rotation of the connecting element with the driven member to disengage it from the driving member against the action of said spring means to stop the controller, and means operative at a predetermined point in the movement of said traversing device for releasing said stop means to reengage the driving connection and start said controller.

30. In a winding machine having a yarn traversing device and a feed mechanism therefor, a control mechanism comprising a rotary controller with drive means therefor including a rotary drive member, a driven member connected with the controller and a connecting element mounted on the driven member and movable into and out of driving relation to the driving member, spring means urging said connecting element toward engagement with the driving member, stop means operative in the rotation of the connecting element with the driven member to disengage it from the driving member against the action of said spring means to stop the controller, means operative at a predetermined point in the movement of said traversing device for releasing said stop means to reengage the driving connection and start said controller, and means operative by the controller for rendering said stop means effective to interrupt the driving connection after a predetermined rotational movement of the controller.

31. In a winding machine having a yarn traversing device and a feed mechanism therefor, a rotary controller having a normal rest position, drive means for the controller comprising a driven member connected with the controller, a continuously rotating drive member and a shiftable clutch element having spring means tending to move it into connecting relation to the driving and driven members, means for operating the clutch member including an operating member mounted on the driven member and a latch element engageable with the operating member to hold said clutch element in disengaged position against the action of said spring means, means operative at a pretermined point in the travel of said traversing device to disengage said latch member from the operating member to release the clutch element for movement by said spring means whereby to start the controller from its said normal rest position, and means operable by the controller for restoring said latch member into position for engagement with the operating member to interrupt the rotation of the controller.

32. In a winding machine having a yarn traversing device and a feed mechanism therefor, a rotary controller having a normal rest position, drive means for the controller comprising a driven member connected with the controller, a continuously rotating drive member and a shiftable clutch element having spring means tending to move it into connecting relation to the driving and driven members, means for operating the clutch member including an operating member mounted on the driven member and a latch element engageable with the operating member to hold said clutch element is disengaged position against the action of said spring means, means operative at a predetermined point in the travel of said traversing device to disengage said latch member from the operating member to release the clutch element for movement by said spring means whereby to start the controller from its said normal rest position, means operable by the controller for restoring said latch member into position for engagement with the operating member to interrupt the rotation of the controller in an intermediate rest position, and means for restarting the controller from its said intermediate rest position including a spring energized as an incident to said restoring movement of the latch element and acting thereon to shift it out of holding relation to the operating member.

33. A controller for winding machines and the like comprising a cam shaft, a driving member, a driven member connected to the cam shaft, a connecting element mounted on the driven member and movable into and out of driving engagement with the driving member, an operating member for the connecting element also mounted on the driven member, spring means tending to shift said element into its driving position, a latch element for the operating member effective in one position to effect withdrawal of the connecting element by the operating member and when in another position to release the connecting element for movement by said spring means, and means governing the position of said latch element including a cam on said shaft and a follower operatively associated with said cam and connected to said latch element.

RUSSELL P. DRAKE.

REFERENCES CITED

The following references are of record in the file of this patent:

UNITED STATES PATENTS

| Number | Name | Date |
|---|---|---|
| 1,311,652 | Kendall | July 29, 1919 |
| 1,341,237 | Koller | May 25, 1920 |
| 1,394,196 | Harris | Oct. 18, 1921 |
| 1,780,578 | Christy | Nov. 4, 1930 |
| 2,075,544 | Reiners et al. | Mar. 30, 1937 |
| 2,252,042 | Sinclair | Aug. 12, 1941 |
| 2,302,715 | Reynolds et al. | Nov. 24, 1942 |
| 2,393,973 | Chisholm | Feb. 5, 1946 |
| 2,411,242 | Beckman | Nov. 19, 1946 |
| 2,439,519 | Marcellus | Apr. 13, 1948 |